May 13, 1958     E. C. HILL     2,834,930
REVERSIBLE CONSTANT-VOLTAGE DIRECT-CURRENT
Filed Sept. 12, 1955
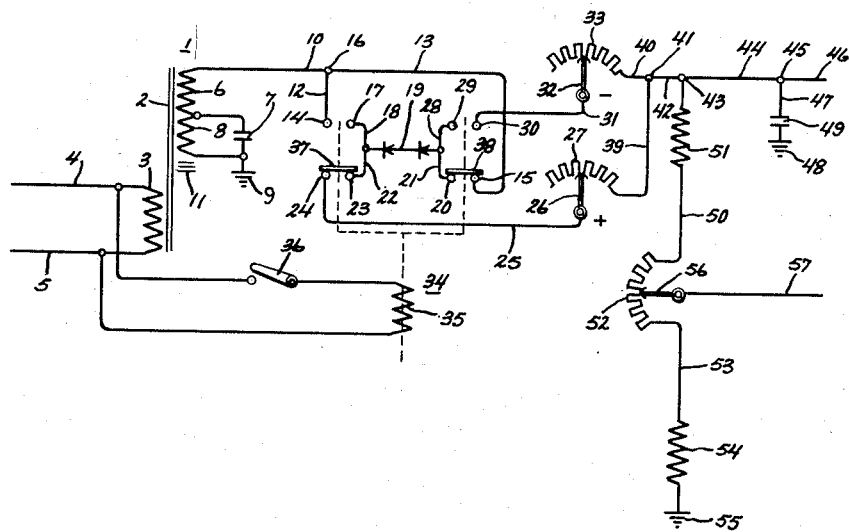
Inventor:
Ezra C. Hill,
by Robert J. Irish
His Attorney.

United States Patent Office

2,834,930
Patented May 13, 1958

2,834,930

REVERSIBLE CONSTANT-VOLTAGE DIRECT-CURRENT

Ezra C. Hill, Fort Wayne, Ind., assignor to General Electric Company, a corporation of New York Application September 12, 1955, Serial No. 533,805

6 Claims. (Cl. 321—8)

This invention relates to electrical regulatory equipment, and more particularly to a circuit for providing reversible constant-voltage direct-current power from a variable-voltage alternating-current source.

Contemporary improvements in many different types of electrically regulated equipment are rapidly increasing the demands upon the electrical regulating circuits associated therewith, since the more versatile and accurate the equipment the more precise must be the control by the regulatory circuit. One instance of such an occurrence is found in the field of printing where xerographic printing devices require a finely regulated constant-voltage electrostatic field; if adequate regulation of the field is not provided, the contrast of the printing suffers, with both the print and the surface around it becoming too dark with an excessively strong field and both the print and the surface around it being light with too weak a field. In addition to the requirement of regulation, it is also desirable in xerographic printing to be able to reverse the polarity of the voltage creating the field. This must be done where only a few copies are to be printed; when one polarity is provided, the field will attract ink to the paper on which the copy is to be made. When the reverse polarity is provided, part of the ink will return to its source to be deposited on a second sheet upon a reversal of the polarity to its previous condition. Thus, apparatus used in xerographic printing requires a regulatory circuit which will provide a high constant voltage to effect a constant electrostatic field and which will also be reversible so as to reverse the direction of the field. These features must be available even though, as is usually the case, the source of power is of the alternating-current type having a relatively variable voltage. It is therefore an object of this invention to provide an improved reversible constant-voltage direct-current circuit which will include the desirable features set forth above.

Further objects and advantages of this invention will become apparent and the invention will be better understood by reference to the following description and the accompanying drawing, and the features of novelty which characterize this invention will be pointed out with particularly in the claims annexed to and forming a part of this specification.

In its broadest aspect, this invention provides a circuit which is capable of providing constant-voltage direct current-power from a variable-voltage alternating-current source. The circuit includes a high-reactance transformer having a primary winding adapted to be connected across the source and a secondary winding with an alternating-current output which will vary in a predetermined manner in response to variations in the input voltage. Current rectifying means are connected in series with the secondary winding, and, in combination with the above predetermined alternating-current voltage variations, provide a constant-voltage direct-current output. Conductive apparatus is connected in series with the rectifying means so as to enable a load to be connected thereto, and switch means are provided for reversing the connections of the rectifying means to the secondary winding and the conductive apparatus respectively.

In the drawing, the single figure is a schematic diagram of the improved circuit of this invention.

Referring now to the single figure of the drawing, there is shown a high-reactance transformer, generally indicated at 1, having a core 2 with a primary winding 3 wound on the core and connected across lines 4 and 5 which in turn are connected across a source of variable-voltage alternating-current power. A secondary winding 6 is also wound on core 2 of transformer 1, and a capacitor 7 is connected across at least a portion 8 of winding 6. One side of winding 6 is grounded, as shown at 9, and a lead 10 extends from the other side to the remainder of the circuit to be described herebelow. Transformer 1 is provided with a path for leakage flux, shown schematically at 11 as is well known in the art. Capacitor 7 draws a leading current through part of winding 6 which has the effect of producing a magnetic flux in the core in the area of winding 6 which aids rather than opposes the exciting flux produced by winding 3. In this manner, with proper dimensioning of core 2, as is well known in the art, it is possible for the core 2 to become saturated in the area of winding 6 without being saturated in the area of winding 3. When thus saturated, it is known that the core in the area of winding 6 has a non-linear reluctance characteristic. It is thus possbile to achieve a predetermined alternating-current voltage variation in the output of transformer 1 by suitable selection of the primary and secondary core portion flux densities. The alternating-current voltage output, together with the wave form thereof, will give a constant direct-current voltage when rectified. The alternating-current voltage variation is made necessary by the fact that core saturation occurs in the area of winding 6 and that, therefore, the wave form of the secondary voltage changes with the voltage input to the primary winding. In this manner, transformer 1 permits the variable-voltage alternating-current to be transformed into alternating current which will vary in a predetermined manner to give constant direct current voltage when rectified.

A pair of lines 12 and 13 respectively terminating in contacts 14 and 15 are connected to line 10 at point 16. Contact 14 is arranged to be connected to a contact 17 which is connected through line 18 to one end of a half-wave rectifier 19, and contact 15 is arranged to be connected to a contact 20 which is connected through a line 21 to the other end of half-wave rectifier 19. A line 22 extends from the same end of rectifier 19 as line 18 and terminates in a contact 23 which is arranged to be connected to a contact 24; contact 24 in turn is connected through a line 25 to the movable member 26 of a variable resistor 27. A line 28 is connected to the same end of rectifier 19 as line 21; line 28 ends in a contact 29 which is arranged to be connected to a contact 30 which in turn is secured to a line 31 which has its other end connected to the movable member 32 of a variable resistor 33.

A solenoid, schematically illustrated at 34, has a coil 35 which is arranged to be energized by connecting it across lines 4 and 5 through a switch 36. When coil 35 is de-energized, bridging contacts 37 and 38 move to a first operative position to connect contacts 23 and 24, and 15 and 20 respectively. Upon energization of the relay coil 35, the two bridging contacts are moved up to a second operative position so that bridging contact 37 connects contacts 14 and 17 and bridging contact 38 connects contacts 29 and 30.

Resistors 27 and 33 are respectively connected by lines 39 and 40 to point 41; from point 41 a line 42 extends to a point 43, line 44, point 45 and out through line 46 to the high volatge side (which may, as explained above, be a plate arranged to produce an electrostatic field). A line 47 is connected to ground at 48 through a capacitor 49; since the rectified current will only be half-wave, and since the drain of the load is a constant one, inclusion of capacitor 49 is desirable to store up voltage and smooth out the power fed through line 46.

A line 50 containing a high resistance 51 is secured to point 43 at one end and to a variable resistor 52 at its other end. Resistor 52 in turn is connected through line 53 to another high resistance 54 and then to ground at 55. The movable member 56 of resistor 52 may be connected to a line 57. Because of the high resistance between lines 46 and 57, the voltage in line 57 will be considerably lower than in line 46. It has been found that when this lower voltage is impressed upon a grid (not shown) interposed between the plate (not shown) charged through line 46 and ground 55, better control of the electrostatic field may be obtained. However, it will be understood that the provision of resistor 52 with movable member 56 and line 57 is not intended to form a part of this invention, and that they may be omitted without detracting from the inventive concept set forth herein.

In operation, secondary winding 6 of transformer 1 has a predetermined alternating-current output variation as stated before; when switch 36 is open and relay coil 35 is de-energized, the circuit passes from point 16, through line 13, contact 15, bridging contact 38, contact 20, line 21, rectifier 19, line 22, contact 23, bridging contact 37, contact 24, line 25, movable member 26, control resistor 27, and line 39 to point 41, etc. By this means, a voltage of predetermined polarity will be supplied ot lines 46 and 57 so that an electrostatic field can be set up between them and ground 55. If it is desired to reverse the direction of the electrostatic field, switch 36 is closed to energize relay coil 35. Bridging contacts 37 and 38 are then moved up so that bridging contact 37 connects contacts 14 and 17 and bridging contact 38 connects contacts 29 and 30. The power circuit then passes through line 12, contact 14, bridging contact 37, contact 17, line 18, rectifier 19, line 28, contact 29, bridging contact 38, contact 30, line 31, movable resistor member 32, resistor 33, and line 40 to point 41, etc. It will be seen that the polarity of the direct current has been reversed with, consequently, a reverse electrostatic field between lines 46 and 57 and ground 55. The high voltages involved make the use of bridging contacts desirable in order to effect a multiple break in the line, but it will be understood that such contact structure does not form an essential part of the invention.

It will be seen from the foregoing that this invention provides a circuit whereby direct-current power of either polarity and of constant voltage may be supplied from a variable-voltage alternating-current power source. While mention has been made of one particular purpose for which such a circuit may be used, it will be apparent that the invention resides in the circuit itself and that its application in different fields is within the scope of the invention. In addition, while the invention has been explained by describing a particular embodiment thereof, it will be apparent that improvements and modifications may be made without departing from the scope of the invention as defined in the appended claims.

What I claim as new and desire to secure by Letters Patent of the United States is:

1. A circuit for providing constant-voltage direct-current power from a variable-voltage alternating-current source comprising a high-reactance transformer having a core, a primary winding on said core adapted to be connected across the source, a secondary winding on another portion of said core, a path for leakage flux between said windings, a capacitor connected across at least a part of said secondary winding thereby to provide a leading current in said secondary winding, said core having a secondary winding portion of such dimensions that saturation occurs at operating voltages whereby said secondary winding has an alternating-current output adapted to vary in a predetermined manner, current rectifying means connected in series with said secondary winding thereby to provide a constant-voltage direct-current output, conductive apparatus connected in series with said rectifying means and adapted to connect a load thereto, and switch means for reversing the connections of said rectifying means to said secondary winding and said conductive apparatus respectively.

2. A circuit for providing constant-voltage direct-current power from a variable-voltage alternating-current source comprising a high-reactance transformer having a core, a primary winding on said core adapted to be connected across the source, a secondary winding on another portion of said core, a path for leaking flux between said windings, a capacitor connected across at least a part of said secondary winding thereby to provide a leading current in said secondary winding, said core having a secondary winding portion of such dimensions that saturation occurs at operating voltages whereby said secondary winding has an alternating-current output adapted to vary in a predetermined manner to provide constant voltage when rectified, current rectifying means connected in series with said secondary winding thereby to provide a constant-voltage direct-current output, conductive apparatus connected in series with said rectifying means and adapted to connect a load thereto, said conductive apparatus including one lead adapted to be connected to a charged plate and one lead connected to ground, and switch means for reversing the connections of said rectifying means to said secondary winding and said conductive apparatus respectively.

3. A circuit for providing constant-voltage direct-current power from a variable-voltage alternating-current source comprising a high-reactance transformer having a core, a primary winding on said core adapted to be connected across the source, a secondary winding on another portion of said core, a path for leakage flux between said windings, a capacitor connected across at least a part of said secondary winding thereby to provide a leading current in said secondary winding, said core having a secondary winding portion of such dimensions that saturation occurs at operating voltages whereby said secondary winding has an alternating-current output adapted to vary in a predetermined manner to provide constant voltage when rectified, current rectifying means, first and second contacts connected to one end of said secondary winding and respectively selectively engageable to the ends of said rectifying means, conductive apparatus adapted to be connected to a load, third and fourth contacts connected to said conductive apparatus and respectively selectively engageable to the ends of said rectifying means, and means for selectively connecting the ends of said rectifying means to said first and third contacts or said second and fourth contacts.

4. A circuit for providing constant-voltage direct-current power from a variable-voltage alternating-current source comprising a high-reactance transformer having a core, a primary winding on said core adapted to be connected across the source, a secondary winding on another portion of said core, a path for leakage flux between said windings, a capacitor connected across at least a part of said secondary winding thereby to provide a leading current in said secondary winding, said core having a secondary winding portion of such dimensions that a saturation occurs at operating voltages whereby said secondary winding has an alternating-current output adapted to vary in a predetermined manner to provide constant voltage when rectified, current rectifying means, first and second contacts connected to one end of said secondary winding, conductive apparatus adapted to be connected to a load, third and fourth contacts connected to said conductive apparatus, fifth and sixth contacts connected to one end of said rectifying means, seventh and eighth contacts connected to the other end of said rectifying means, first and second bridging contacts movable together respectively to first and second operative positions, said first bridging contact being arranged to connect said first and fifth contacts in said first operative position and said third and sixth contacts in said second operative position, said second bridging contact being arranged to connect said fourth and seventh contacts in said second and eighth contacts in said second operative position, and means for selectively moving said bridging contacts to one of said operative positions.

5. A circuit for providing constant-voltage direct-current power from a variable-voltage alternating-current source comprising a high-reactance transformer having a core, primary winding on said core adapted to be connected across the source, a secondary winding on another portion of said core, a path for leakage flux between said windings, a capacitor connected across at least a part of said secondary winding thereby to provide a leading current in said secondary winding, said core having a secondary winding portion of such dimensions that saturation occurs at operating voltages whereby said secondary winding has an alternating-current output adapted to vary in a predetermined manner to provide constant voltage when rectified, current rectifying means, first and second contacts connected to one end of said secondary winding and respectively selectively engageable to the ends of said rectifying means, conductive apparatus adapted to be connected to a load, a pair of variable resistors each connected in series with said conductive apparatus, third and fourth contacts connected respectively to said variable resistors and respectively selectively engageable to the ends of said rectifying means, and means for selectively connecting the ends of said rectifying means to said first and third contacts or said second and fourth contacts.

6. A circuit for providing constant-voltage direct-current power from a variable-voltage alternating-current source comprising a high leakage reactance transformer having a core, a primary winding on said core adapted to be connected across the source, a secondary winding on another portion of said core, a path for leakage flux between said windings, a capacitor connected across at least a part of said secondary winding thereby to provide a leading current in secondary winding, said core having a secondary winding portion of such dimensions that saturation occurs at operating voltages whereby said secondary winding has an alternating-current output adapted to vary in a predetermined manner to provide constant voltage when rectified, a half-wave direct-current rectifier, first and second contacts connected to one end of said secondary winding and respectively engageable to the ends of said rectifier, conductive apparatus adapted to be connected to a load, a pair of variable resistors each connected in series with said conductive apparatus, third and fourth contacts connected to said variable resistors respectively and respectively selectively engageable to the ends of said rectifier, and means for selectively connecting the ends of said rectifying means to said first and third contacts or said second and fourth contacts, said conductive apparatus including one lead adapted to be connected to a charged plate and one lead connected to ground.

References Cited in the file of this patent
UNITED STATES PATENTS
2,342,628    Evjen et al. _____ Feb. 29, 1944

UNITED STATES PATENT OFFICE
CERTIFICATE OF CORRECTION

Patent No. 2,834,930                              May 13, 1958

Ezra C. Hill

It is hereby certified that error appears in the printed specification of the above numbered patent requiring correction and that the said Letters Patent should read as corrected below.

Column 2, line 27, for "possbile" read -- possible --; column 3, line 32, for "ot" read -- to --; column 4, line 15, for "leaking" read -- leakage --; column 5, line 16, after "core," insert -- a --; column 6, line 18, for "wace" read -- wave --.

Signed and sealed this 22nd day of July 1958.

(SEAL)
Attest:

KARL H. AXLINE                                        ROBERT C. WATSON
Attesting Officer                                      Commissioner of Patents